(12) United States Patent
Kim

(10) Patent No.: US 12,038,003 B2
(45) Date of Patent: Jul. 16, 2024

(54) PUMP

(71) Applicant: LG INNOTEK CO., LTD., Seoul (KR)

(72) Inventor: Sang Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 165 days.

(21) Appl. No.: 17/773,758

(22) PCT Filed: Oct. 7, 2020

(86) PCT No.: PCT/KR2020/013678
§ 371 (c)(1),
(2) Date: May 2, 2022

(87) PCT Pub. No.: WO2021/101064
PCT Pub. Date: May 27, 2021

(65) Prior Publication Data
US 2023/0003219 A1 Jan. 5, 2023

(30) Foreign Application Priority Data

Nov. 21, 2019 (KR) .......................... 10-2019-0150617

(51) Int. Cl.
F04C 2/10 (2006.01)
F04C 15/00 (2006.01)
H02K 1/14 (2006.01)
H02K 1/278 (2022.01)
H02K 5/22 (2006.01)

(52) U.S. Cl.
CPC ............ *F04C 15/008* (2013.01); *F04C 2/102* (2013.01); *F04C 2/103* (2013.01); *H02K 1/145* (2013.01); *H02K 1/278* (2013.01); *H02K 5/225* (2013.01); *F04C 2210/206* (2013.01); *F04C 2240/10* (2013.01); *F04C 2240/20* (2013.01); *F04C 2240/30* (2013.01); *F04C 2240/40* (2013.01); *F04C 2240/808* (2013.01)

(58) Field of Classification Search
CPC .............................................. F04C 2/102–103
See application file for complete search history.

(56) References Cited

U.S. PATENT DOCUMENTS

2008/0159885 A1   7/2008  Kameya et al.
2012/0164009 A1*  6/2012  Sakata .................... F04C 2/084
                                                                418/171

(Continued)

FOREIGN PATENT DOCUMENTS

CN     102996435 A    3/2013
CN     103591019 A    2/2014

(Continued)

*Primary Examiner* — Thomas Fink
(74) *Attorney, Agent, or Firm* — Birch, Stewart, Kolasch & Birch, LLP

(57) ABSTRACT

This pump comprises: a housing comprising a body and a first partition which separates first and second areas; a stator disposed in the housing; a circuit board disposed in the first area; a pump gear disposed in the second area; and magnets disposed on the pump gear, wherein the second area includes a second space defined by the first partition wall and the body, and the stator is inserted into the body.

18 Claims, 17 Drawing Sheets

(56) References Cited

U.S. PATENT DOCUMENTS

| | | | |
|---|---|---|---|
| 2013/0071267 A1* | 3/2013 | Miyaki | F04C 2/10 |
| | | | 417/410.1 |
| 2014/0079578 A1 | 3/2014 | Irie et al. | |
| 2015/0139831 A1 | 5/2015 | Yoon | |
| 2019/0036415 A1* | 1/2019 | Kataoka | H01R 13/50 |
| 2019/0249661 A1 | 8/2019 | Wang et al. | |

FOREIGN PATENT DOCUMENTS

| | | | | |
|---|---|---|---|---|
| CN | 106855051 A | * | 6/2017 | F04B 17/03 |
| CN | 108855051 A | | 6/2017 | |
| JP | 2003-129966 A | | 5/2003 | |
| JP | 2013-234597 A | | 11/2013 | |
| JP | 2013234597 A | * | 11/2013 | |
| JP | 5391016 B2 | | 1/2014 | |
| KR | 10-0910434 B1 | | 8/2009 | |

* cited by examiner

PUMP

CROSS REFERENCE TO RELATED APPLICATIONS

This application is the National Phase of PCT International Application No. PCT/KR2020/013678, filed on Oct. 7, 2020, which claims priority under 35 U.S.C. 119(a) to Patent Application No. 10-2019-0150617, filed in the Republic of Korea on Nov. 21, 2019, all of these applications being hereby expressly incorporated by reference into the present application.

TECHNICAL FIELD

The present embodiment relates to a pump.

BACKGROUND ART

A pump serves to discharge the amount of flow at a constant pressure. The oil circulated by the pump can be used to operate a hydraulic system using hydraulic pressure, or for a cooling or lubricating effect.

A mechanical oil pump (MOP) is an oil pump that operates using the power of a machine such as an engine.

Recently, research on hybrid vehicles and electric vehicles has been actively conducted for the purpose of improving fuel efficiency and reducing carbon emissions.

Accordingly, the demand for an electric oil pump (EOP) operated by a motor instead of a mechanical oil pump (MOP) operated by the power of a machine such as an engine is increasing.

The EOP has a pump-integrated structure in which the housing of the pump and the housing of the motor are integrated. Such a pump-integrated structure has advantages of reduced volume and light weight, but may cause damage to the pump when assembling the motor.

The EOP may typically include a motor region and a pump region. The motor region includes a stator, a rotor, and a rotation shaft. The pump region includes an inner rotor coupled to one end of the rotation shaft to receive rotational force from the rotation shaft, and an outer rotor accommodating the inner rotor.

According to the EOP having the above structure, there is a problem in that the motor part and the pump part in a single pump exist independently, thereby increasing the number of parts. In addition, there is a problem in that the overall size of the product increases as the length increases in the axial direction.

DETAILED DESCRIPTION OF THE INVENTION

Technical Subject

The present invention has been proposed to improve the above problems, and it is to provide a pump capable of reducing the manufacturing cost owing to the reduction in the number of parts, and enabling the miniaturization thereof.

Technical Solution

As an embodiment, a pump comprises: a housing including a body and a first partition wall which separates first and second areas; a stator disposed in the housing; a circuit board disposed in the first area; a pump gear disposed in the second area; and magnets disposed on the pump gear, wherein the second area includes a second space defined by the first partition wall and the body, and wherein the stator is inserted into the body.

The first area includes a first space, wherein the first area and the second space may not be connected by the first partition wall.

The stator includes a core, an insulator coupled to the core, and a coil wound on the insulator, wherein at least a portion of the insulator may be exposed to the outside of the body.

The stator includes a core, an insulator coupled to the core, and a coil wound on the insulator, wherein the stator is molded inside the body and may not be exposed to the outside of the body.

At least a portion of the body may be disposed between the stator and the pump gear.

The magnet may be disposed on an outer peripheral surface of the pump gear to correspond to the coil.

The housing includes a terminal, wherein the terminal may be connected to the coil and the circuit board.

The first partition wall includes a first protrusion being protruded in a direction facing the pump gear, wherein the pump gear may include a first groove in which the first protrusion is disposed.

A first cover disposed above the first area and a second cover disposed below the second area are included, wherein a first opening and a second opening having a predetermined shape are formed on one surface of the second cover, wherein a third opening connected to the first opening and a fourth opening connected to the second opening are formed on the other surface of the second cover, and wherein a third groove corresponding to the shape of the first opening and a fourth groove corresponding to the shape of the second opening may be included on one surface of the first partition wall.

The pump gear may include an external gear and an internal gear disposed inside the external gear.

Advantageous Effects

According to the present invention, since the rotation shaft for transmitting the rotational force of the motor region to the pump region in the pump according to the conventional structure becomes unnecessary, there is an advantage in that the number of parts is reduced, thereby lowering the manufacturing cost.

In addition, in the conventional structure in which the motor region and the pump region are partitioned in up and down directions, since the length in up and down directions is formed to be short by removing the rotation shaft, there is an advantage in that the product can be miniaturized.

In addition, since the space in which the fluid is accommodated with other regions is divided through a partition wall, there is an advantage in that the leaking of the fluid to other regions can be prevented. In particular, there is an advantage that the stator can be protected from fluid by embedding the stator inside the housing.

In addition, there is an advantage in that noise can be reduced by disposing the external and internal gears, which are the main causes of noise, in the innermost space of the housing.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
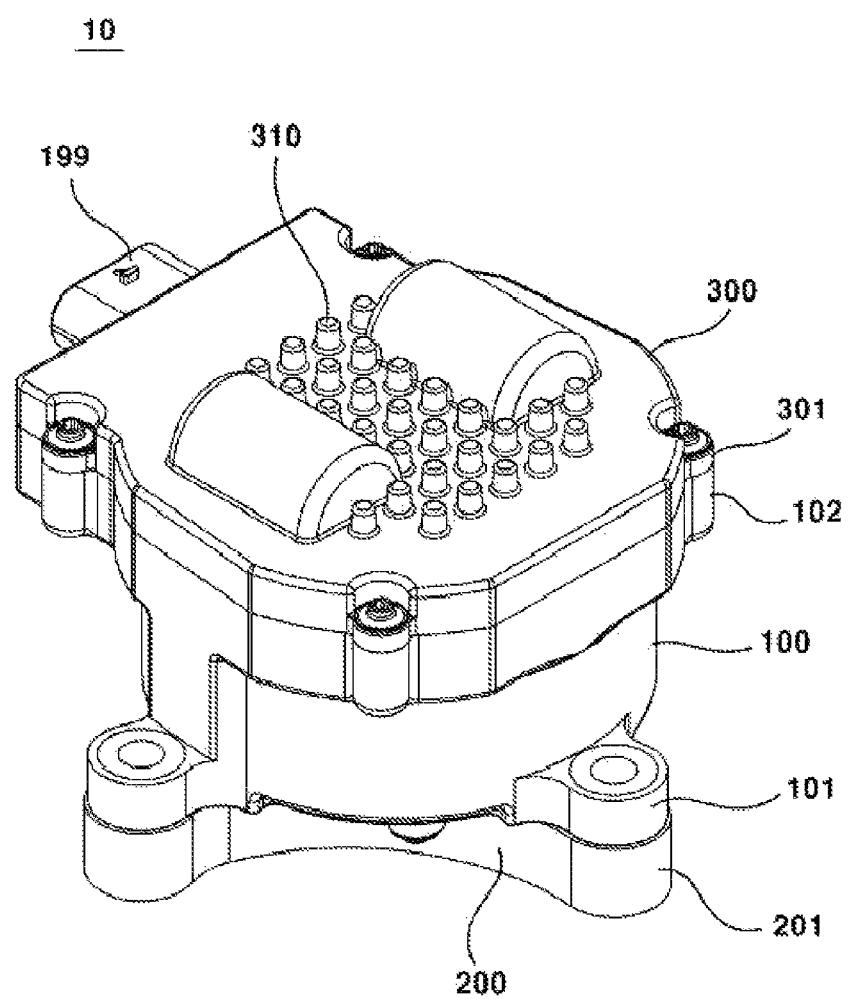
FIG. 1 is a perspective view of a pump according to an embodiment of the present invention.
Figure 2:
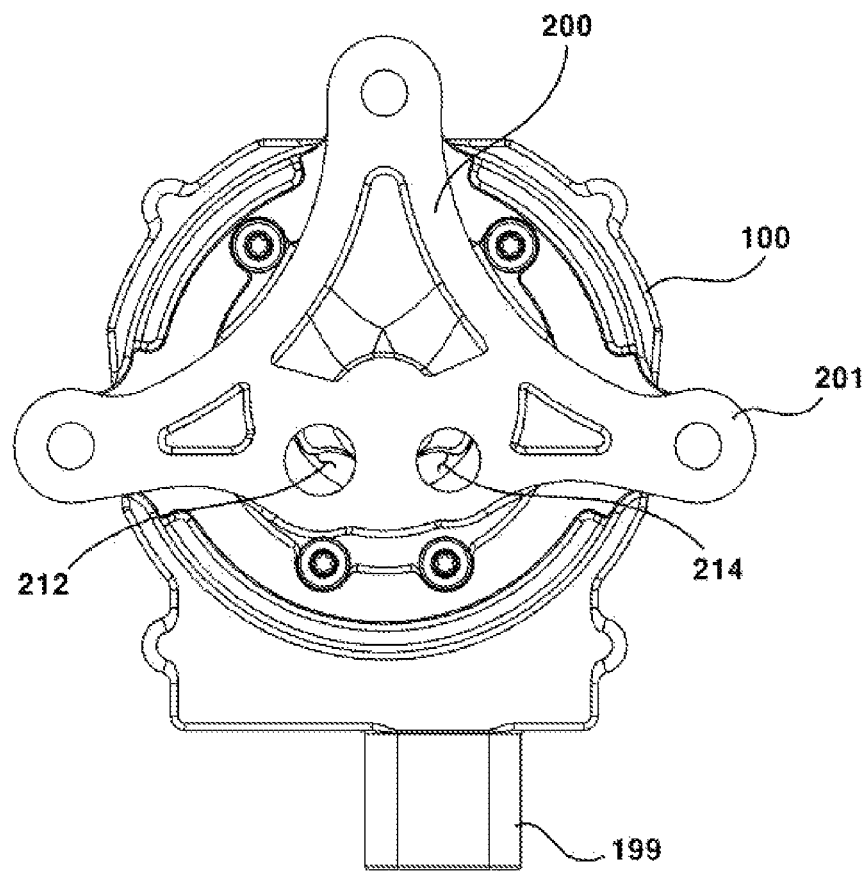
FIG. 2 is a plan view illustrating a lower surface of a pump according to an embodiment of the present invention.
Figure 3:
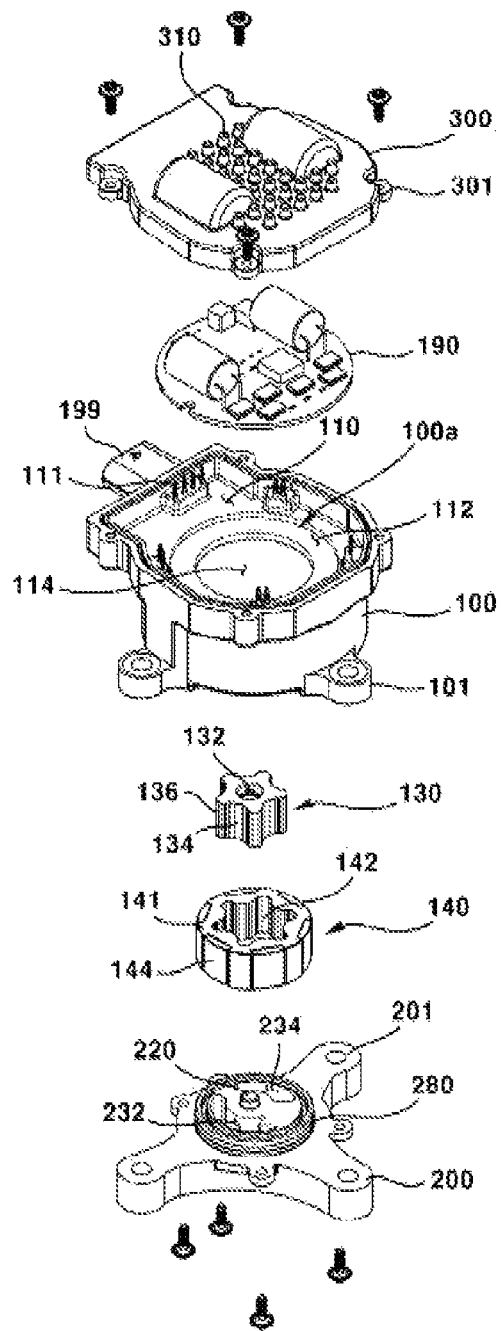
FIG. 3 is an exploded perspective view of a pump according to an embodiment of the present invention.
Figure 4:
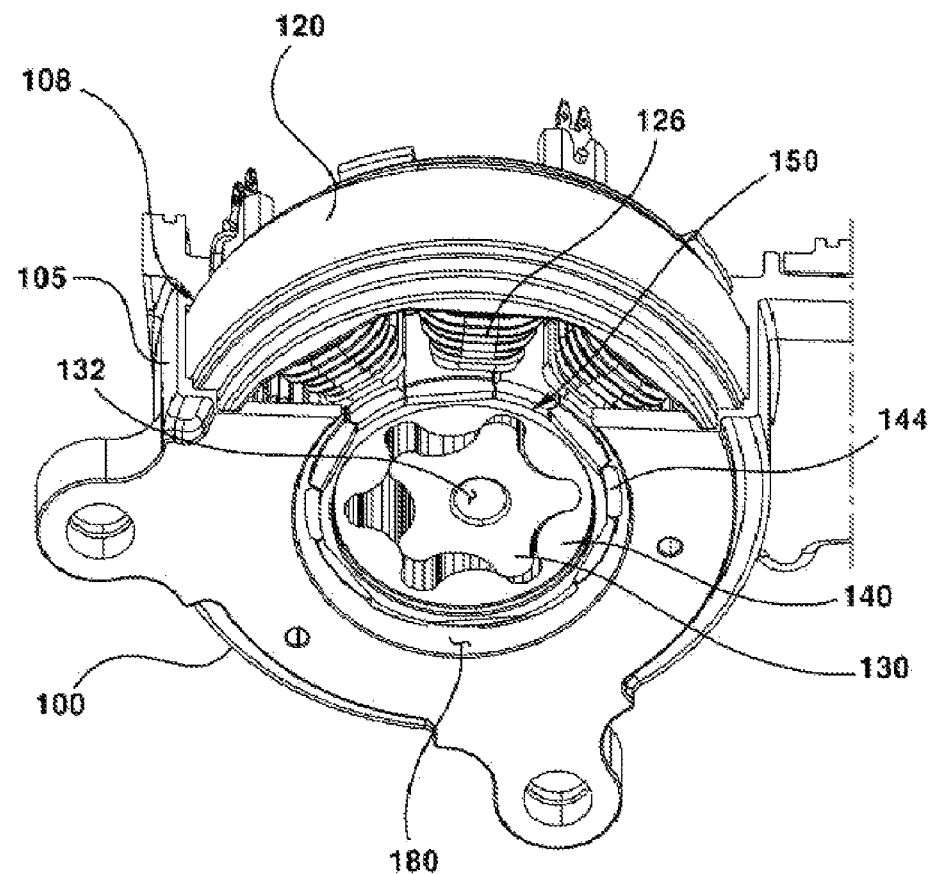
FIG. 4 is a perspective view illustrating a coupling state of an external gear and an internal gear in a housing according to an embodiment of the present invention.
Figure 5:
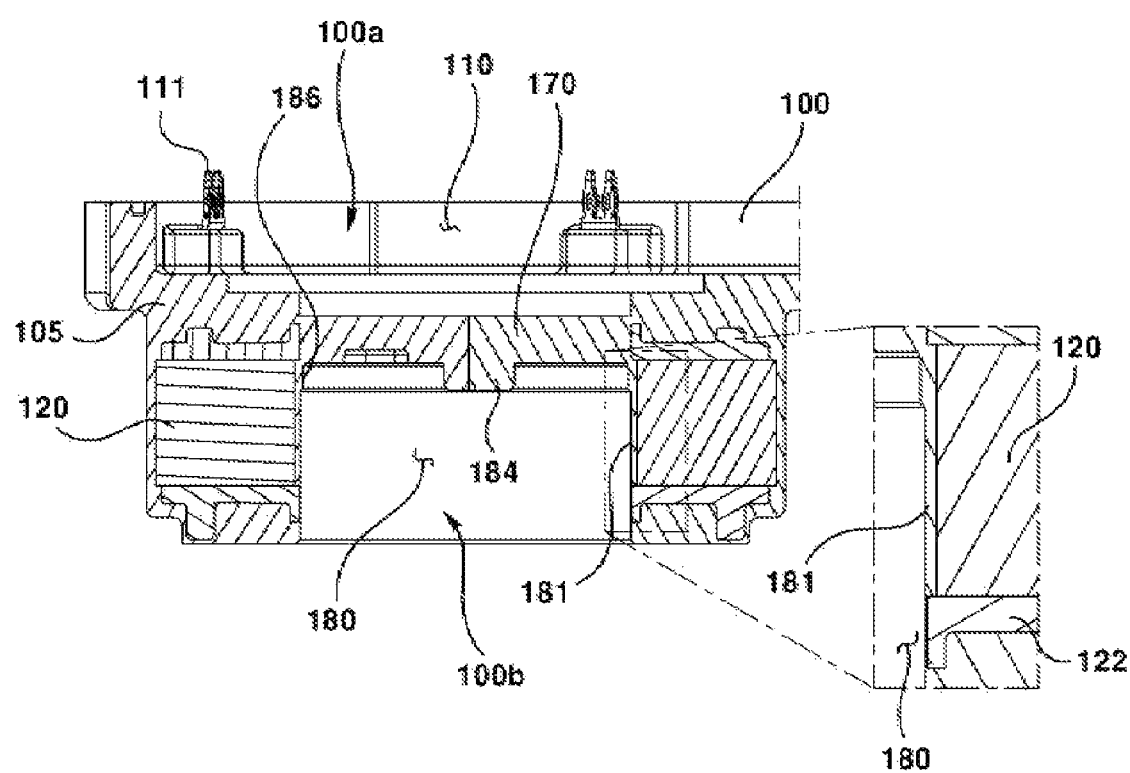
FIG. 5 is a cross-sectional view of a housing according to an embodiment of the present invention.
Figure 6:
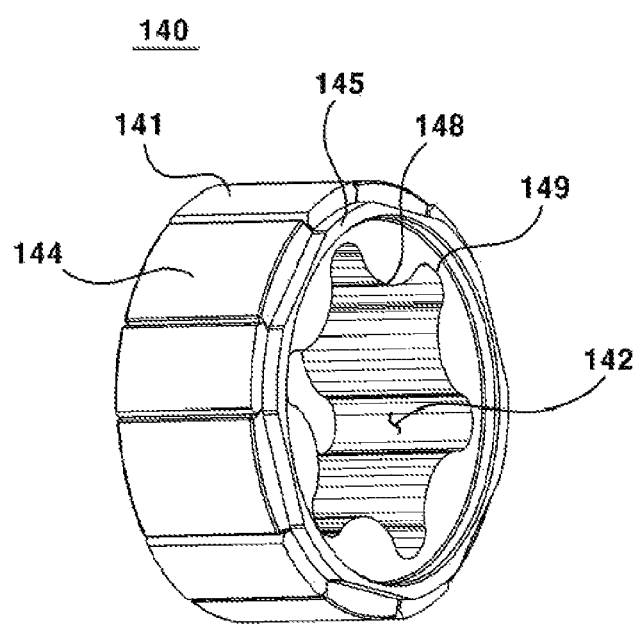
FIG. 6 is a perspective view of an external gear according to an embodiment of the present invention.

FIG. 1 is a perspective view of a pump according to an embodiment of the present invention; FIG. 2 is a plan view illustrating a lower surface of a pump according to an embodiment of the present invention; FIG. 3 is an exploded perspective view of a pump according to an embodiment of the present invention; FIG. 4 is a perspective view illustrating a coupling state of an external gear and an internal gear in a housing according to an embodiment of the present invention; FIG. 5 is a cross-sectional view of a housing according to an embodiment of the present invention; and FIG. 6 is a perspective view of an external gear according to an embodiment of the present invention.

FIG. 4 is a perspective view illustrating in which a portion of the housing is being cut out.

Referring to FIGS. 1 to 6, the pump 10 according to an embodiment of the present invention may have an external shape formed by coupling the housing 100, the second cover 200, and the first cover 300.

With respect to the housing 100, the second cover 200 may be coupled to a lower surface of the housing 100. The first cover 300 may be coupled to an upper surface of the housing 100. The housing 100 and the second cover 200 may include a first coupling part 101 and a second coupling part 201 to which screws are being screw-coupled, respectively. Accordingly, the housing 100 and the second cover 200 may be screw-coupled through the screws. The housing 100 and the first cover 300 may include a third coupling part 102 and a fourth coupling part 301 to which screws are screw-coupled. Accordingly, the housing 100 and the first cover 300 may be screw-coupled.

A first opening 212 through which the fluid is being sucked, and a second opening 214 through which the circulated fluid is being discharged may be formed on one surface of the second cover 200. A third opening 232 connected to the first opening 212 and a fourth opening 234 connected to the second opening 214 may be formed on the other surface of the cover 200.

On an upper surface of the second cover 200, a mounting part 280 being protruded upward and being coupled to a second space 180 (refer to FIG. 4) inside the housing 100 to be described later. The cross section of the mounting part 280 may be a circular shape. A screw thread or a screw groove may be formed on an outer peripheral surface of the mounting part 280. In addition, a screw thread or a screw groove may be formed on an inner peripheral surface of the second space 180 facing the outer peripheral surface of the mounting part 280. Due to this, the mounting part 280 may be screw-coupled to the inner peripheral surface of the second space 180. A cross-sectional shape of the mounting part 280 may correspond to a cross-sectional shape of the second space 180. A ring-shaped sealing member (not shown) for sealing the second space 180 may be disposed on an outer peripheral surface of the mounting part 280. The sealing member may be formed of a rubber material to prevent fluid from leaking between the outer peripheral surface of the mounting part 280 and the inner peripheral surface of the second space 180.

A third opening 232 through which the fluid is being sucked and a fourth opening 234 through which the fluid that has been sucked is discharged may be formed on an upper surface of the second cover 200. The fluid may be oil. Each of the third opening 232 and the fourth opening 234 may be formed to have an arc shape, and may be provided such that the gap becomes gradually narrower as it travels from one side to the other. More specifically, it may be disposed in a way that the wide side of the gap of the third opening 232 faces the wide side of the gap of the fourth opening 234, and the narrow side of the gap of the third opening 232 faces the narrow side of the gap of the fourth opening.

In a present embodiment, the cross-sectional area of the third opening 232 is formed to be larger than that of the fourth opening 234 as an example, but the cross-sectional area of the fourth opening 234 may be formed to be larger than that of the third opening 232.

The third opening 232 and the fourth opening 234 may be disposed on an upper surface of the mounting part 280.

A protruded portion 220 being protruded upward may be disposed on an upper surface of the second cover 200. The protruded portion 220 may be disposed in the center of the mounting part 280. The protruded portion 220 may be coupled to a hole 132 inside the internal gear 130 to be described later to support the internal gear 130.

A first space 110 may be formed on an upper surface of the housing 100. The first space 110 may have a groove shape. A plurality of electronic components for driving may be disposed in the first space 110. For example, in the first space 110, a circuit board 190 and a terminal 111 may be disposed. A plurality of devices may be mounted on the circuit board 190. A connector 199 may be disposed on a side surface of the housing 100. The connector 199 may be electrically connected to the circuit board 190. An external terminal may be coupled to the connector 199. For this reason, power may be applied to the pump 10 or a signal for driving may be transmitted or received.

In a bottom surface of the first space 110, a fifth groove 112 that is formed by being more recessed compared to other regions may be included. A cross-sectional shape of the fifth groove 112 may be disposed to correspond to a cross-sectional shape of the circuit board 190. Due to this, the circuit board 190 may be firmly fixed on the fifth groove 112.

A sixth groove 114 that is formed by being more recessed compared to other regions may be disposed on the bottom surface of the fifth groove 112. A portion of the lower surface of the circuit board 190 may be disposed to be spaced apart from the bottom surface of the sixth groove 114 due to the sixth groove 114.

The first cover 300 may be coupled to an upper portion of the housing 100 so as to cover the first space 110. A plurality of heat dissipation fins 310 being protruded upward may be disposed on an upper surface of the first cover 300. The cross-sectional area of the first cover 300 may be increased through the heat dissipation fins 310. Accordingly, heat generated in the first space 110 may be dissipated.

A stator 120 and a pump gear 150 may be disposed in the housing 100. The pump gear 150 may include an external gear 140 and an internal gear 130. The internal gear 130 may be disposed inside the external gear 140. The housing 100 may be formed of a resin or plastic material.

The housing 100 may include a first partition wall 170 that divides the first region 100a from the second region 100b, and a body 105. The first region 100a may include a first space 110. The second region may include a second space 180 defined by the first partition wall 170 and the body 105. The first space 110 and the second space 180 may not be connected by the first partition wall 170.

The stator 120 may be disposed inside the housing 100. The stator 120 may be inserted into the body 105. At least a portion of the body 105 may be disposed between the stator 120 and the pump gear 150.

The stator 120 may be integrally formed with the housing 100 by double injection. The stator 120 and the housing 100 may be integrally formed by insert injection. The stator 120 may be molded inside the body 105 and accommodated inside the housing 100. A stator accommodating space 108 in which the stator 120 is being disposed may be formed inside the housing 100. The stator accommodating space 108 may be disposed outside the second space 180. The outer surface of the stator 120 may be surrounded by the housing 100.

The stator 120 may include a core and a coil 126 being wound around the core. The stator 120 may include an insulator 122 being disposed to surround the outer surface of the core. The coil 126 may be wound on an outer surface of the insulator 122. The terminal 111 may be disposed on the first space 110 so as to be coupled to the circuit board 190 and the coil 126. Accordingly, at least a portion of the insulator 122 may be exposed to the outside of the body. In addition, the stator 120 may be molded in the body 105 so as not to be exposed to the outside of the body 105.

The second space 180 may be disposed in a central region of the housing 100. The second space 180 may have a groove shape in which a portion of a lower surface of the housing 100 is being recessed upward. The arrangement region of the stator 120 and the second space 180 may be partitioned by a second partition wall 181. In other words, the second partition wall 181 may be disposed between the core and the external gear 140 to be described later. The second partition wall 181 may be formed to a thickness of 0.2 mm to 1 mm.

The second space 180 and the first space 110 may be partitioned in up and down directions by the first partition wall 170. A lower surface of the first partition wall 170 may form an upper surface of the second space 180. The second space 180 and the first space 110 may be partitioned into different regions through the first partition wall 170. Accordingly, it is possible to prevent the fluid inside the second space 180 from flowing into the first space 110 in advance.

The external gear 140 and the internal gear 130 may be disposed in the second space 180.

The external gear 140 may be disposed inside the stator 120. The second partition wall 181 may be disposed between the external gear 140 and the stator 120.

The external gear 140 may include a core 141 and a magnet 144 being mounted on the core 141. The magnet 144 may be disposed on an outer peripheral surface of the core 141 to correspond to the coil 126. The external gear 140 may be a surface permanent magnet (SPM) type in which the magnet 144 is attached to the outer peripheral surface of the core 141. To this end, a groove in which the magnet 144 is mounted may be formed in an outer peripheral surface of the core 141. The groove may be provided in plurality, and may be disposed to be spaced apart from each other in a circumferential direction.

Accordingly, when a current is applied to the coil 126 of the stator 120, the external gear 140 may be rotated by electromagnetic interaction between the stator 120 and the external gear 140.

In the center of the external gear 140, a first hole 142 in which the internal gear 130 is disposed may be formed. A plurality of ridges being protruded inward from the inner peripheral surface and valleys disposed between the plurality of ridges may be formed on an inner peripheral surface of the first hole 142. That is, a first gear in which a plurality of peaks and valleys are alternately disposed may be formed on an inner peripheral surface of the first hole 142.

The internal gear 130 may be disposed inside the external gear 140. The external gear 140 may be called an external rotor, and the internal gear 130 may be called an internal rotor. The internal gear 130 and the external gear 140 may be disposed so that the centers do not coincide with each other.

The outer peripheral surface of the internal gear 130 may include a plurality of ridges 136 being protruded outward from the outer peripheral surface and valleys 134 disposed between the plurality of ridges 136. A second gear in which a plurality of ridges 136 and a plurality of valleys 133 are alternately disposed may be formed on an outer peripheral surface of the internal gear 130.

In other words, in the internal gear 130, the second lobe 136 having N number of gear teeth may be disposed along the circumferential direction outward in the radial direction with respect to the rotation center. The external gear 140 may be provided with N+1 number of the first lobes 149 inward in the radial direction. The first lobe 149 may be disposed to be caught by the second lobe 136. When the external gear 140 is rotated, the internal gear 130 may be rotated by the first lobe 149 and the second lobe 136. According to the rotation of the internal gear 130, the fluid may be introduced into the second space 180 or the fluid in the second space 180 may be discharged to the outside.

In summary, by the eccentricity of the external gear 140 and the internal gear 130, a volume capable of transporting the fluid fuel is generated between the external gear 140 and the internal gear 130 so that the portion with the increased volume sucks the surrounding fluid due to pressure drop, and the portion with the reduced volume discharges the fluid due to the increase in pressure.

Meanwhile, on the upper surface of the second space 180, that is, the lower surface of the first partition wall 170, a guide 186 being protruded downward may be formed. The guide 186 may be formed in a ring shape so that an inner peripheral surface thereof may face an outer peripheral surface of the external gear 140. The cross-sectional shape of the inner peripheral surface of the guide 186 may be formed to correspond to the cross-sectional shape of the outer peripheral surface of the external gear 140. Accordingly, the external gear 140 may be rotated by being guided by an inner peripheral surface of the external gear 140.

Unlike this, on an upper portion of the external gear 140, a guide portion (not shown) may be formed to be stepped more upward than other regions, and disposed inside the guide 186. In this case, the guide part may have a smaller cross-sectional area than other regions of the external gear 140.

The height of the guide 186 being protruded from the lower surface of the first partition wall 170 may be formed to be smaller than one half of the height of the second space 180.

On the upper surface of the second space 180 and the lower surface of the first partition wall 170, a first protrusion 184 being protruded downward in a direction toward the pump gear 150 may be formed. In addition, a first groove 132 may be formed in the pump 150 so that the first protrusion 184 is coupled thereto. More specifically, the first groove 132 may be formed in the center of the internal gear 130 to penetrate through the lower surface from the upper surface. The first protrusion 184 may be coupled to the first groove 132. That is, the first protrusion 184 may form a rotation center of the internal gear 130. Accordingly, the first protrusion 184 supports the rotation of the internal gear 130 inside the second space 180.

The height of the first protrusion 184 being protruded from the lower surface of the first partition wall 170 may be formed to be smaller than one half of the height of the second space 180.

A third groove 188 and a fourth groove 189 may be formed on a lower surface of the first partition wall 170. Each of the third groove 188 and the fourth groove 189 may have a groove shape that is recessed more upward than other region or a lower surface of the first partition wall 170. The third groove 188 may be in the shape being overlapped with the first opening 212 or the third opening 232 in up and down directions. The fourth groove 189 may be in the shape being overlapped with the second opening 214 or the fourth opening 234. That is, the cross-sectional shape of the third groove 188 corresponds to the cross-sectional shape of the first opening 212 or the third opening 232, and the cross-sectional shape of the fourth groove 189 may be formed to correspond to the cross-sectional shape of the second opening 214 or the fourth opening 234. Accordingly, the hydraulic pressure balance of the fluid in the second space 180 can be maintained.

The first protrusion 184 may be disposed between the third groove 188 and the fourth groove 189.

According to the structure as described above, since the rotation shaft for transmitting the rotational force of the motor region to the pump region in the pump according to the conventional structure becomes unnecessary, there is an advantage in that the number of parts is reduced, and due to this, there is an advantage in that the manufacturing cost can be lowered.

In addition, in the conventional structure in which the motor region and the pump region are partitioned in up and down directions, since the length in up and down directions is formed to be short by removing the rotation shaft, there is an advantage in that the product can be miniaturized.

In addition, since the space in which the fluid is accommodated with other regions is divided through a partition wall, there is an advantage in that the leaking of the fluid to other regions can be prevented. In particular, there is an advantage that the stator can be protected from fluid by embedding the stator inside the housing.

In addition, there is an advantage in that noise can be reduced by disposing the external and internal gears, which are the main causes of noise, in the innermost space of the housing.

Figure 7:
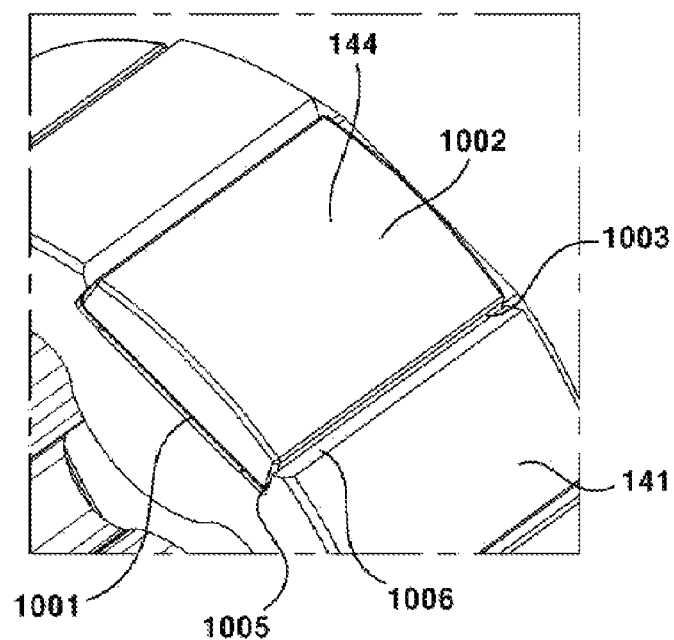
FIG. 7 is a perspective view illustrating a state in which a magnet is coupled to a core according to an embodiment of the present invention.
Figure 8:
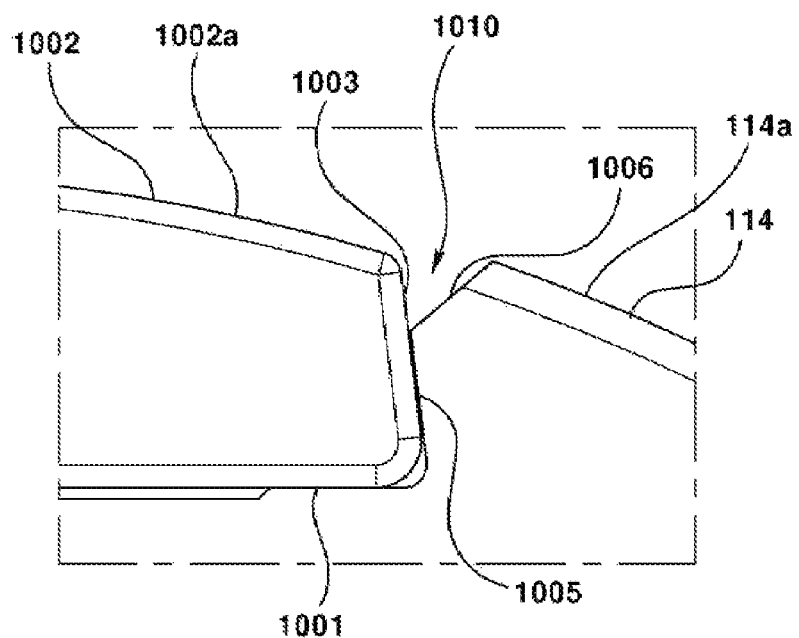
FIG. 8 is a cross-sectional view illustrating a part of FIG. 7.
Figure 9:
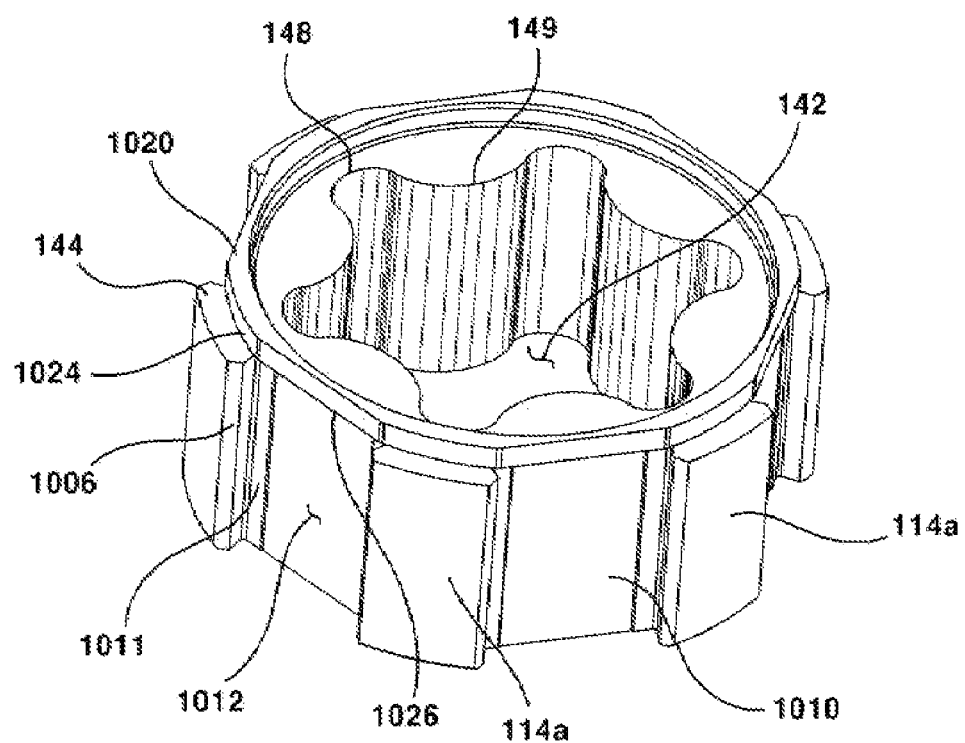
FIG. 9 is a perspective view of a core according to an embodiment of the present invention.
Figure 10:
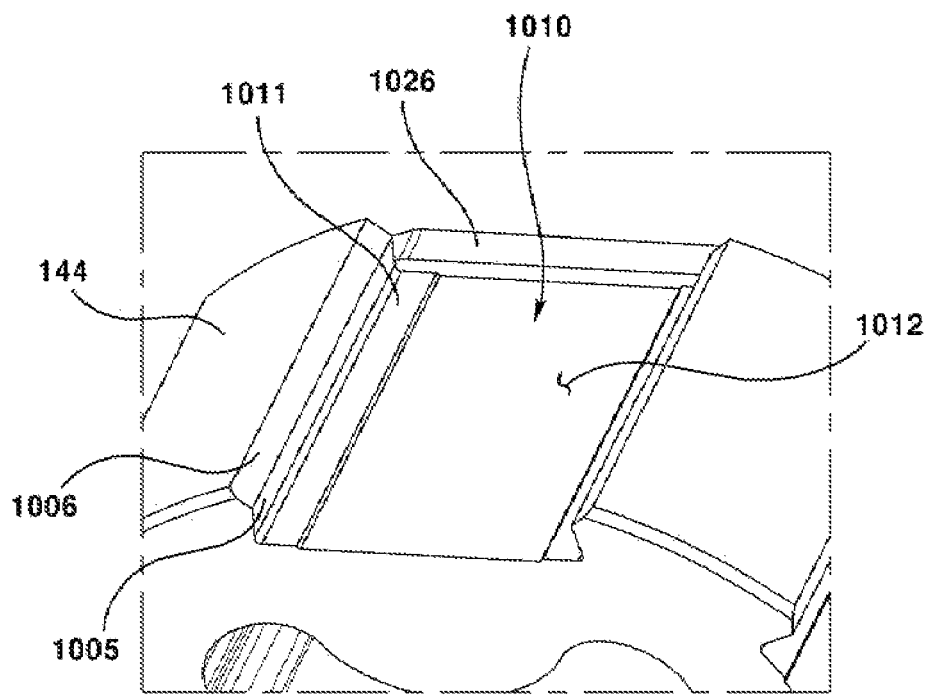
FIG. 10 is an enlarged perspective view of a groove in which a magnet inside a core according to an embodiment of the present invention is being coupled.
Figure 11:
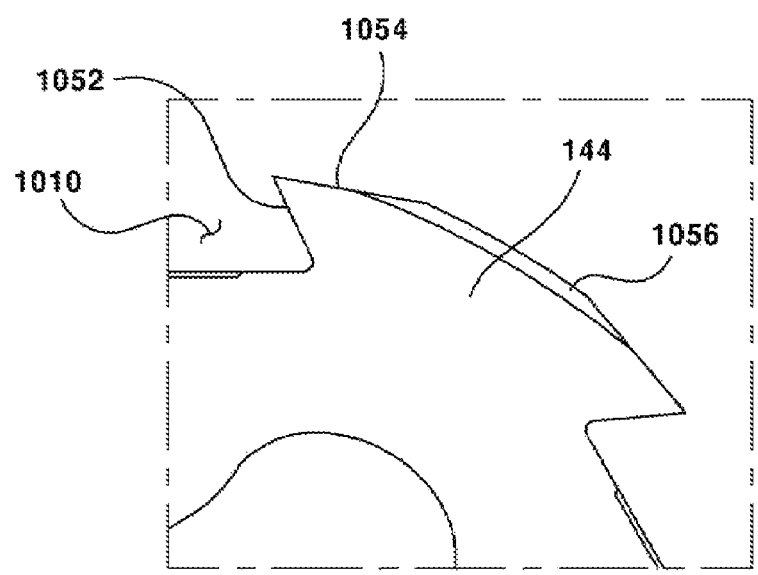
FIG. 11 is a modified embodiment of a core according to an embodiment of the present invention.

FIG. 7 is a perspective view illustrating a state in which a magnet is coupled to a core according to an embodiment of the present invention; FIG. 8 is a cross-sectional view illustrating a part of FIG. 7; FIG. 9 is a perspective view of a core according to an embodiment of the present invention;

FIG. 10 is an enlarged perspective view of a groove in which a magnet inside a core according to an embodiment of the present invention is being coupled; and FIG. 11 is a modified embodiment of a core according to an embodiment of the present invention.

Referring to FIGS. 7 to 10, as described above, the external gear 140 may include a core 141 and a magnet 144 disposed on an outer surface of the core 141. On an outer surface of the core 141, an accommodating groove 1010 may be formed to be more recessed than other regions so that the magnet 144 is coupled thereto.

The magnet 144 may include: an inner surface 1001 facing the bottom surface 1011 of the accommodating groove 1010; an outer surface 1002 facing the inner surface 1001 and exposed to the outside; and a side surface 1003 connecting the inner surface 1001 and the outer surface 1002.

The magnet 144 may have a cross-sectional area of the inner surface 1001 larger than that of the outer surface 1002. For this reason, a first inclined surface may be formed on a side surface 1003 so that the length in the circumferential direction of the magnet 144 becomes shorter as it travels toward the outside.

In other words, the magnet 144 may include a first outer peripheral surface 1002a, and the external gear 140 may include a second outer peripheral surface 144a. In this case, the curvature of the first outer peripheral surface 1002a may be smaller than the curvature of the second outer peripheral surface 144a. The accommodating groove 1010 may be disposed between a plurality of adjacent second outer peripheral surfaces 144a.

In addition, the magnet 144 may include a plurality of unit magnets. The plurality of unit magnets may be disposed to be spaced apart from each other along a circumferential direction of the external gear 140. The second outer peripheral surface 144a may be disposed between two adjacent unit magnets among the plurality of unit magnets.

Meanwhile, the accommodating groove 1010 may include a bottom surface 1011 facing the inner surface 1001 and an inner peripheral surface facing the side surface 1003. The inner peripheral surface may include a first inner peripheral surface 1005 in contact with the side surface 1003 and a second inner peripheral surface 1006 spaced apart from the side surface 1003. A second inclined surface may be formed on the first inner peripheral surface 1005 to correspond to the first inclined surface of the side surface 1003.

In other words, the accommodating groove 1010 may include a bottom surface 1011 and side surfaces 1005 and 1006 connected to the bottom surface 1011. In this case, the side surfaces 1005 and 1006 may include a first region 1005 inclined at a first angle and a second region 1006 inclined at a second angle.

Here, the first region 1005 may be in contact with a side surface of the magnet 1002. And, the second region 1006 may not be in contact with a side surface of the magnet 1002.

In addition, a third inclined surface may be formed on the second peripheral surface 1006 so that the distance from the side surface of the magnet 144 increases as it travels toward the outside. Accordingly, the second peripheral surface 1006 may be spaced apart from the side surface of the magnet 144 as described above. The third inclined surface may be inclined with respect to the second inclined surface. The third inclined surface and the second inclined surface may have an obtuse angle.

Meanwhile, the size of the inner surface of the magnet 144 facing the accommodating groove 1010 may be smaller than the size of the first outer peripheral surface 1002.

Unlike this, as illustrated in FIG. 11, the second inclined surface 1052 may have an acute angle with the third inclined surface 1054. In this case, the side surface 1056 of the core 144 may be formed to be smaller, so that the friction force with the peripheral surface of the second space 180 may be further reduced. In summary, the side surface of the magnet 144 may form an acute angle with the inner surface of the magnet 144.

Therefore, according to the above-described structure, by forming a first inclined surface on a side surface of the magnet 144 and the first peripheral surface, the separation of the magnet 144 from the accommodating groove 1010 can be prevented. In addition, since the outer cross-sectional area of the core 141 can be formed to be relatively small due to the structure of the first inclined surface of the second peripheral surface 1006, there is an advantage that can reduce friction caused by the rotation of the external gear 140.

Referring to FIGS. 9 and 10, an adhesive accommodating groove 1012 being recessed more inward than other regions may be formed on a bottom surface of the accommodating groove 1010. The bottom surface of the adhesive accommodating groove 1012 may be disposed to be stepped with the bottom surface 1011. An adhesive may be accommodated in the adhesive accommodating groove 1012. Accordingly, the magnet 144 may be firmly fixed in the accommodating groove 1010.

In addition, a step 1026 being protruded outward may be disposed on an upper end of the outer peripheral surface of the core 141. The step 1026 may be protruded more outward than other regions, so that a lower surface thereof may be in contact with an upper surface of the magnet 144. Accordingly, the magnet 144 may be slid upward from a lower portion of the accommodating groove 1010 to be coupled inside the accommodating groove 1010.

The step 1026 may be disposed at the lower end of the core 141.

A side surface of the step 1026 may be disposed to be protruded more outward than a bottom surface of the accommodating groove 1010.

A side surface of the step 1026 may include a straight portion and a curved portion. The straight portion and the curved portion may be alternately disposed along a circumferential direction of the core 141. The straight portion may be disposed in a region being overlapped with the accommodating groove 1010 in up and down directions, and the curved portion may be disposed in other region.

Figure 12:
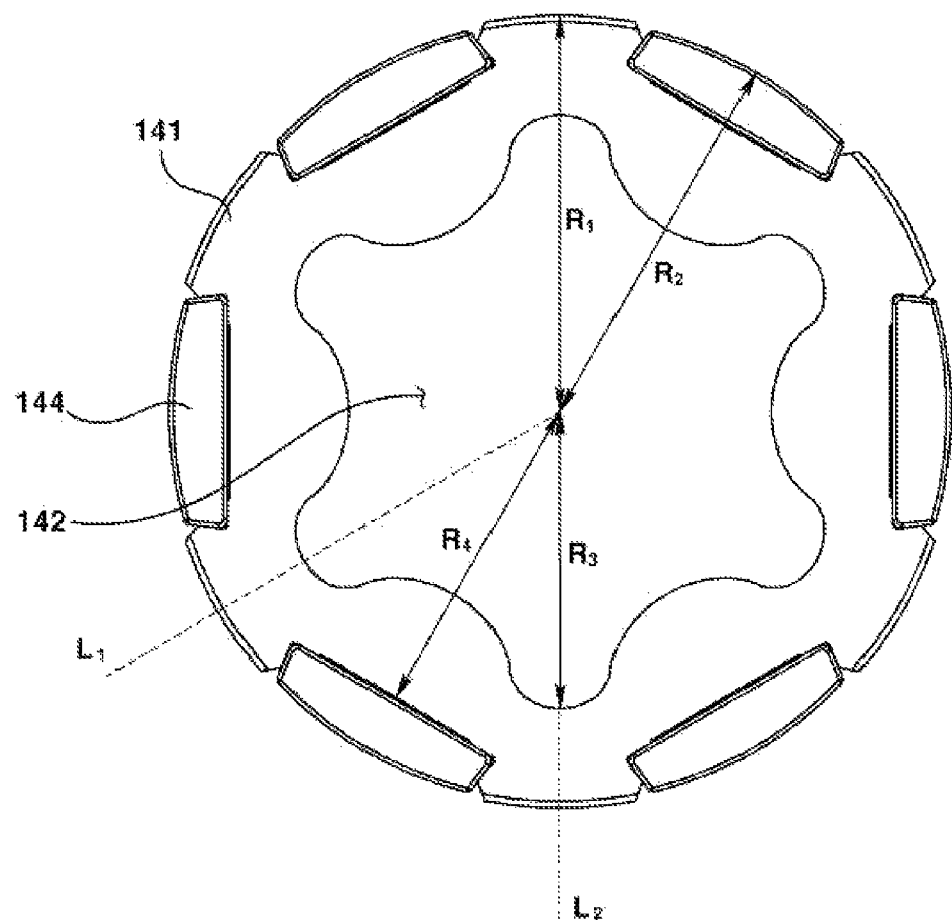
FIG. 12 is a plan view illustrating an upper surface or a lower surface of an external gear according to an embodiment of the present invention.

FIG. 12 is a plan view illustrating an upper surface or a lower surface of an external gear according to an embodiment of the present invention.

Referring to FIG. 12, a convex surface may be formed on an outer surface of the magnet 144, and a flat surface may be formed on an inner surface of the magnet 144 to correspond to the bottom surface of the accommodating groove 1010.

The distance R2 from the center of the core 141 to the outer surface of the magnet 144 may be formed to be smaller than the distance R1 from the center of the core 141 to the outer surface of the core 141. That is, in the external gear 140, the outer surface of the core 141 may be disposed more outside than the outer surface of the magnet 144.

In other words, with respect to the radial direction of the external gear 140, the linear distance from the center of the external gear 140 to the second outer peripheral surface 114a may be larger than the maximum linear distance from the center of the external gear 140 to the first outer peripheral surface 1002a.

And, the distance R4 from the center of the core 141 to the inner surface of the magnet 144 may be formed longer than the distance R3 from the center of the core 141 to the inner surface of the lobe 149. Accordingly, the rotational efficiency of the external gear 140 according to the magnetic flux of the magnet 144 may be enhanced.

The peripheral surface of the external gear 140 may include a concave portion 148 and a convex portion 149. The concave portion 148 and the convex portion 149 may be alternately disposed along the circumferential direction on the peripheral surface of the external gear 140. The convex portion 149 may be disposed closer to the center of the external gear 140 than the concave portion 148.

Meanwhile, the magnet 144 may be disposed in a region being overlapped with the convex portion 149 in a radial direction. Accordingly, the concave portion 149 may be disposed to be overlapped with a region between the adjacent magnets 144 in a radial direction. That is, the second outer peripheral surface 114a may be disposed to be overlapped with the concave portion 148 in a radial direction.

That is, the imaginary lines L1 and L2 connecting the center of the core 141 and the region dividing the concave portion 149 in half in the circumferential direction may be disposed so as to pass through the region dividing between the adjacent magnets 144 in half in the circumferential direction.

And, the shortest distance from the center of the external gear 140 to the magnet 144 may be greater than the maximum distance from the center of the external gear 140 to the bottom surface of the concave portion 148 in a radial direction.

Figure 13:
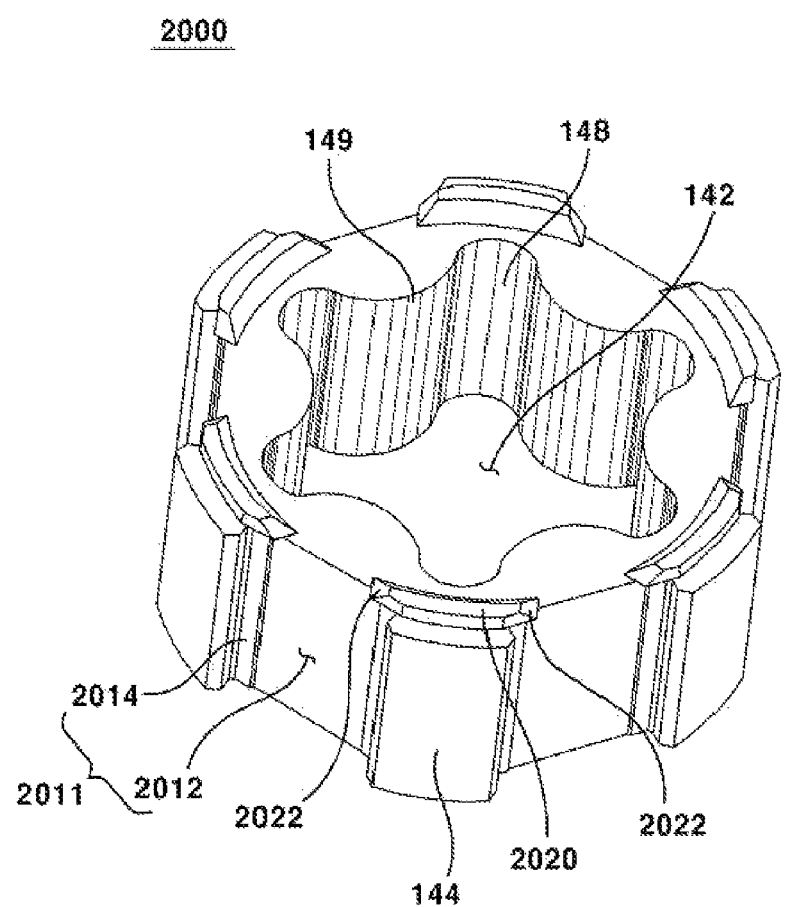
FIG. 13 is a perspective view of a core according to a second embodiment of the present invention.
Figure 14:
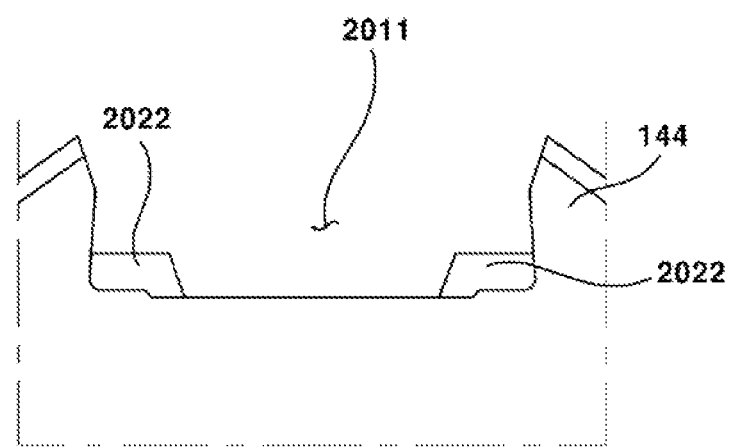
FIG. 14 is a plan view illustrating a lower surface of a groove according to a second embodiment of the present invention.

FIG. 13 is a perspective view of a core according to a second embodiment of the present invention; and FIG. 14 is a plan view illustrating a lower surface of a groove according to a second embodiment of the present invention.

In the present embodiment, other parts are the same as in the first embodiment, except that there is a difference in the shape of the step. Accordingly, only the characteristic parts of the present embodiment will be described below, and the first embodiment will be referred to for the remaining parts.

Referring to FIGS. 13 and 14, in a core 2000 according to the present embodiment, a plurality of side portions 2030 and grooves 2011 may be alternately disposed on an outer peripheral surface. A magnet may be coupled to the groove 2011. The groove 2011 may include a bottom surface 2014 and an adhesive accommodating groove 2012.

On an upper end of the core 2000, a step 2020 being protruded outward may be disposed. The step 2020 may be disposed to be overlapped with a side portion 2030 in up and down directions. The length of the step 2020 in a circumferential direction may be longer than the length of the side portion 2030 in the circumferential direction. Accordingly, both ends 2022 of the step 2020 may be protruded outward of the side portion 2030. Both ends 2022 of the step 2020 may be disposed to be overlapped with at least a portion of the groove 2011 in up and down directions.

Accordingly, when the magnet is coupled inside the groove 2011, the upper surface of the magnet may be supported by the lower surface of the step 2020.

Figure 15:
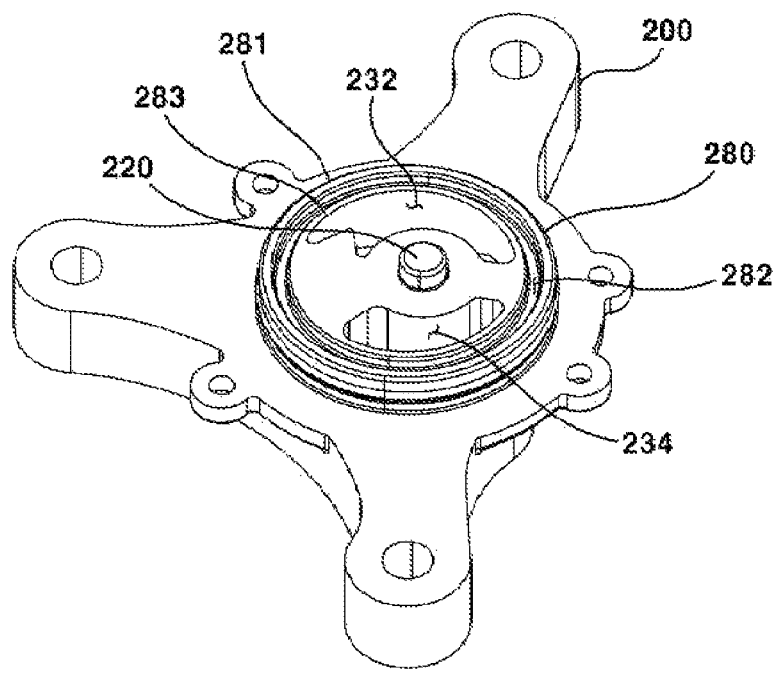
FIG. 15 is a perspective view of a second cover according to an embodiment of the present invention.
Figure 16:
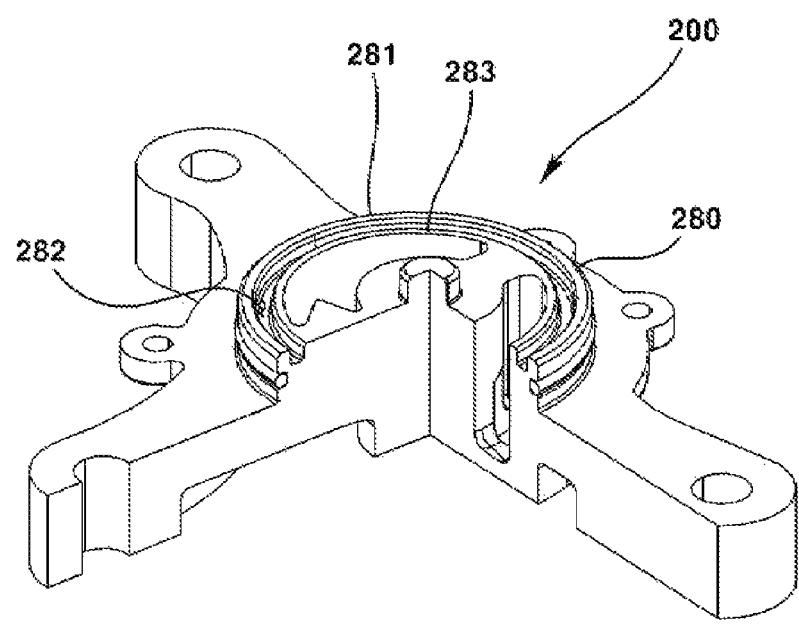
FIG. 16 is a perspective view illustrating a second cover according to an embodiment of the present invention in which a portion thereof is cut open.

FIG. 15 is a perspective view of a second cover according to an embodiment of the present invention; FIG. 16 is a perspective view illustrating a second cover according to an embodiment of the present invention in which a portion thereof is cut open; and FIG. 17 is a cross-sectional view illustrating a coupling state of a second cover and a pump gear according to an embodiment of the present invention.

Figure 17:
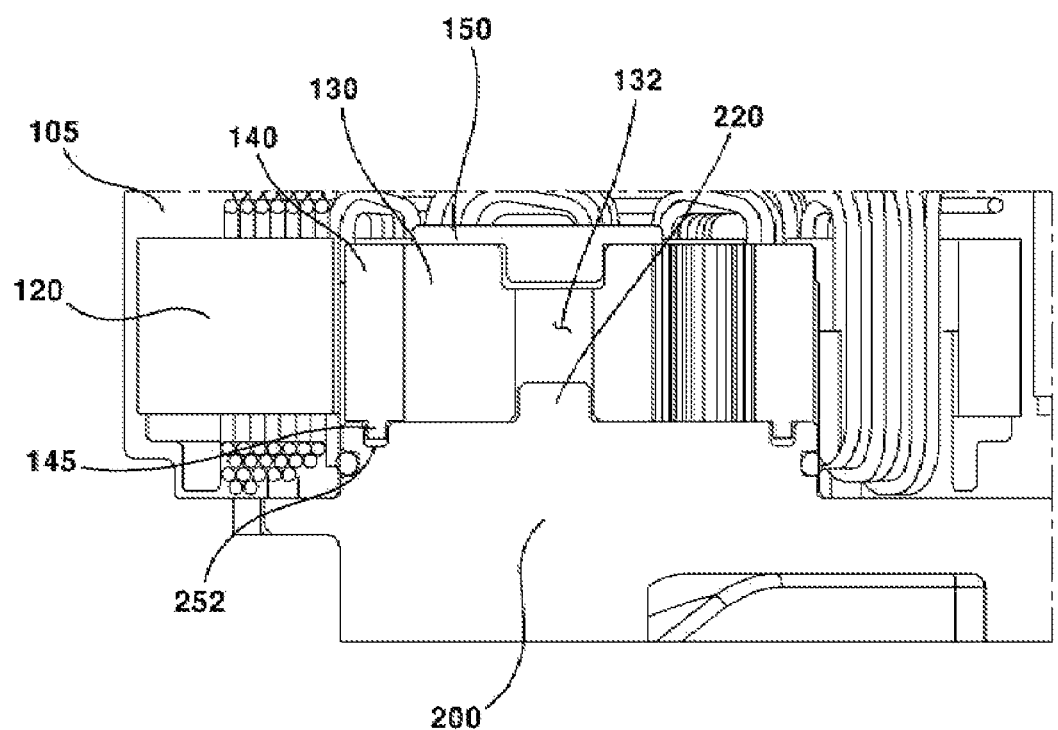
FIG. 17 is a cross-sectional view illustrating a coupling state of a second cover and a pump gear according to an embodiment of the present invention.

Referring to FIGS. 15 to 17, the pump gear 150 may include a first guide part 145 being protruded toward the second cover 200. The first guide part 145 may be disposed in the external gear 140 among the pump gear 150. The first guide part 145 may be formed to be protruded downward from the lower surface of the external gear 140. The first guide part 145 may be formed in a ring shape including one surface having a constant curvature.

The height of the first guide part 145 may be 20% to 50% of the height of the external gear 140.

In addition, a guide groove 282 may be disposed in the second cover 200 in a way that the first guide part 145 is inserted thereto. The guide groove 282 may be disposed between the inner portion 283 and the outer portion 281. One surface of the guide groove 282 facing the side surface of the first guide part 145 may be in contact with each other. That is, a peripheral surface of the first guide part 145 and a peripheral surface of the guide groove 282 may be in contact.

Referring to FIGS. 6 and 15 to 17, the inner diameter of the first guide part 145 is greater than the maximum distance from the center of the external gear 140 to the peripheral surface of the first hole 142, and may be smaller than the shortest distance from the center of the external gear 140 to the magnet 144.

In addition, the first guide part 145 may include a first thickness of a region being overlapped with the magnet 144 in a radial direction and a second thickness of a region not being overlapped with the magnet 144 in a radial direction. At this time, the first thickness may be smaller than the second thickness.

Meanwhile, the first guide part 145 may not be overlapped with the magnet 144 in a radial direction and a direction perpendicular to the radial direction.

According to the structure as described above, there is an advantage that the pump gear 150 can be firmly fixed inside the second space 180.

In the above description, it is described that all the components constituting the embodiments of the present invention are combined or operated in one, but the present invention is not necessarily limited to these embodiments. In other words, within the scope of the present invention, all of the components may be selectively operated in combination with one or more. In addition, the terms "comprise", "include" or "having" described above mean that the corresponding component may be inherent unless specifically stated otherwise, and thus it should be construed that it does not exclude other components, but further include other components instead. All terms, including technical and scientific terms, have the same meaning as commonly understood by one of ordinary skill in the art unless otherwise defined. Terms used generally, such as terms defined in a dictionary, should be interpreted to coincide with the contextual meaning of the related art, and shall not be interpreted in an ideal or excessively formal sense unless explicitly defined in the present invention.

The above description is merely illustrative of the technical idea of the present invention, and those skilled in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A pump comprising:
a housing including a body and a first partition wall which separates first and second areas;
a stator disposed in the housing;
a circuit board disposed in the first area;
a pump gear disposed in the second area; and
magnets disposed on the pump gear,
wherein the second area includes a second space defined by the first partition wall and the body,
wherein the stator is molded inside the body and not exposed to the outside of the body,
wherein the first partition wall includes a first protrusion being protruded in a direction facing the pump gear, and
wherein the pump gear includes a first groove in which the first protrusion is disposed.

2. The pump according to claim 1, wherein the first area includes a first space, and
wherein the first area and the second space is not connected by the first partition wall.

3. The pump according to claim 1, wherein a second partition wall is disposed between the stator and the pump gear, and
wherein the second area is disposed inside the second partition wall.

4. The pump according to claim 1, wherein stator includes a core, an insulator coupled to the core, and a coil wound on the insulator.

5. The pump according to claim 1, wherein at least a portion of the body is disposed between the stator and the pump gear.

6. The pump according to claim 1, wherein the magnet is disposed on an outer peripheral surface of the pump gear to correspond to the coil.

7. The pump according to claim 1, wherein the housing includes a terminal, and
wherein the terminal is connected to the coil and the circuit board.

8. A pump comprising:
a housing including a body and a first partition wall which separates first and second areas;
a stator disposed in the housing;
a circuit board disposed in the first area;
a pump gear disposed in the second area;
magnets disposed on the pump gear;
a first cover disposed above the first area; and
a second cover disposed below the second area,
wherein the second area includes a second space defined by the first partition wall and the body,
wherein the stator is molded inside the body and not exposed to the outside of the body,
wherein a first opening and a second opening having a predetermined shape are formed on one surface of the second cover,
wherein a third opening connected to the first opening and a fourth opening connected to the second opening are formed on the other surface of the second cover, and
wherein a third groove corresponding to the shape of the first opening and a fourth groove corresponding to the shape of the second opening are included on one surface of the first partition wall.

9. The pump according to claim 1, wherein the pump gear includes an external gear and an internal gear disposed inside the external gear.

10. The pump according to claim 9, wherein the magnet includes a first outer peripheral surface,
wherein the external gear includes a second outer peripheral surface, and
wherein a curvature of the first outer peripheral surface is smaller than a curvature of the second outer peripheral surface.

11. The pump according to claim 10, wherein the magnet includes a plurality of unit magnets, and
wherein the second outer peripheral surface is disposed between two adjacent unit magnets among the plurality of unit magnets.

12. The pump according to claim 10, wherein the external gear includes a receiving groove in which the magnet is disposed.

13. The pump according to claim 10, wherein a linear distance from a center of the external gear to the second outer peripheral surface is greater than a maximum linear distance from the center of the external gear to the first outer peripheral surface.

14. The pump according to claim 12, wherein the receiving groove includes a bottom surface and a side surface connected to the bottom surface, and
wherein the side surface includes a third area inclined at a first angle and a fourth area inclined at a second angle.

15. The pump according to claim 14, wherein the third area is in contact with the side surface of the magnet, and the fourth area does not contact the side surface of the magnet.

16. A pump comprising:
a housing including a body and a first partition wall which separates first and second areas;
a stator disposed in the housing;
a circuit board disposed in the first area;
a pump gear disposed in the second area; and
magnets disposed on the pump gear,
wherein the second area includes a second space defined by the first partition wall and the body,
wherein the stator is molded inside the body and not exposed to the outside of the body,
wherein a second cover is coupled to the housing,
wherein the pump gear includes a first guide part protruding toward the second cover, and
wherein the second cover includes a guide groove into which the first guide part is inserted.

17. The pump according to claim 16, wherein an inner circumferential surface of the first guide part and an inner circumferential surface of the guide groove contact each other.

18. The pump according to claim 16, wherein a height of the first guide part is 20% to 50% of a height of the pump gear.

* * * * *